Aug. 4, 1931. L. G. HAASE ET AL 1,817,307
EXTENSIBLE METER BOX
Filed Jan. 2, 1930
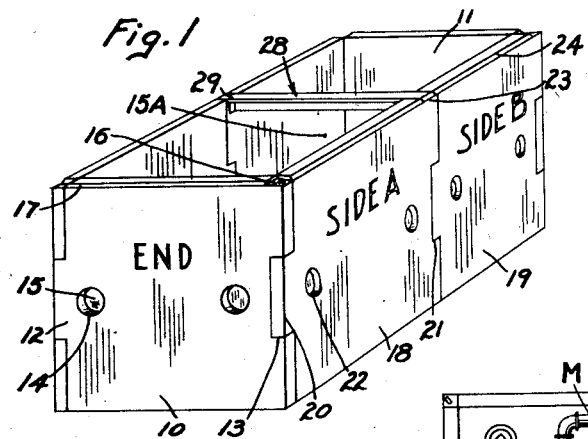
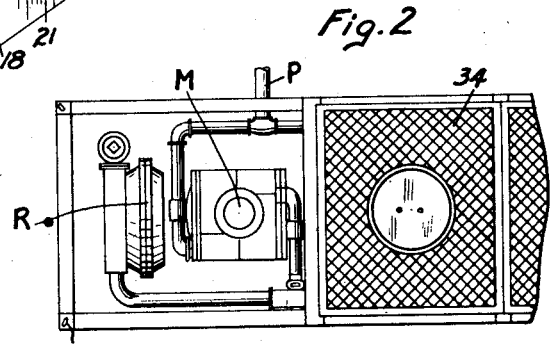
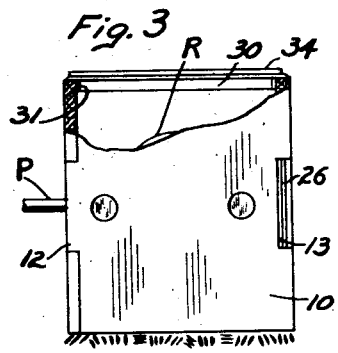
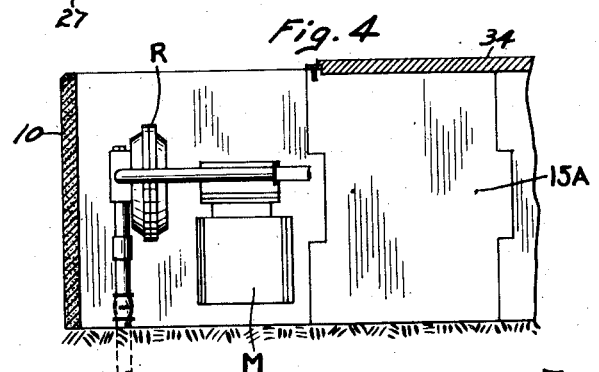
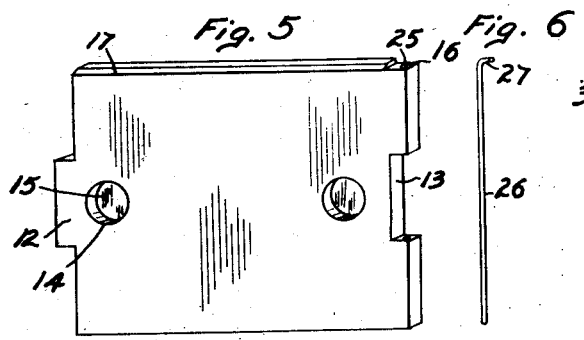
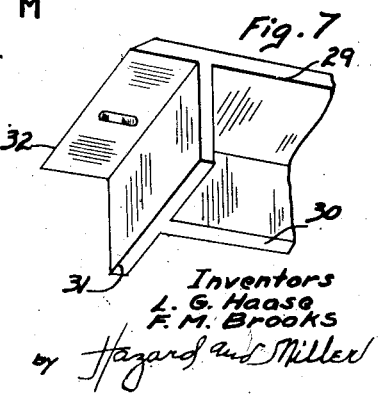
Inventors
L. G. Haase
F. M. Brooks
by Hazard and Miller
Attorneys Patented Aug. 4, 1931

1,817,307

UNITED STATES PATENT OFFICE

LEO G. HAASE AND FRANK M. BROOKS, OF PASADENA, CALIFORNIA, ASSIGNORS TO ART CONCRETE WORKS, OF PASADENA, CALIFORNIA, A CORPORATION OF CALIFORNIA

EXTENSIBLE METER BOX

Application filed January 2, 1930. Serial No. 418,105.

This invention relates to improvements in meter boxes and relates primarily to boxes designed to contain one or more gas meters although it may be employed with other meters as well.

It is now becoming customary to locate gas meters at points remote from the buildings or dwellings and where the dwelling supplied with gas is a large one or requires several meters it is highly desirable to locate all of the meters in the same meter box. In high pressure gas systems it is also highly desirable to locate the regulator in the meter box together with the meters.

It is an object of this invention to provide an improved meter box designed to contain one or more gas meters together with a regulator, if a regulator is required, and which is extensible or adjustable so that the meter box may be assembled at the location of the meters and made of the desired size to contain all the necessary meters and regulator, if the regulator is required. The improved meter box is designed to be recessed in the ground near the dwelling or building in such a manner that access to the meter for reading purposes is readily available without requiring entrance to the dwelling and also for the advantageous purpose of eliminating fire hazard.

Another object of the invention is to provide a meter box made up of sections which are detachably fastened together enabling the sections to be made up and kept in stock and easily carried from place to place and assembled in forming meter boxes of different sizes, depending upon the number of gas meters it is desired to have contained therein. By the improved construction a relatively small number of differently sized sections may be made up, kept in stock, and carried to the location of the gas meters. A large number of differently sized meter boxes may be made up from such sections, however, corresponding to the various requirements so that it is no longer necessary to keep a large number of different sized meter boxes in stock to correspond to the different possible requirements.

With the foregoing and other objects in view, which will be made manifest in the following detailed description, and specifically pointed out in the appended claims, reference is had to the accompanying drawings for an illustrative embodiment of the invention, wherein:

Fig. 1 is a perspective view illustrating the improved meter box in assembled condition.

Fig. 2 is a partial plan view of the meter box.

Fig. 3 is a view in end elevation of the improved meter box, parts being broken away and shown in vertical section.

Fig. 4 is a longitudinal section through the improved meter box.

Fig. 5 is a perspective view of one of the sections employed in the construction of the improved meter box.

Fig. 6 is a view of one of the fastening elements.

Fig. 7 is a partial view in perspective illustrating the end of a spreader which may be employed in the improved meter box.

Referring to the accompanying drawings, wherein similar reference characters designate similar parts throughout, the improved meter box is made up of a plurality of sections, the number of which varies in accordance with the size of the box which may be required. All boxes, regardless of size, however, are formed of two end walls or end sections 10 and 11, which walls or sections are duplicates of each other having along one side edge a laterally extending tongue 12. On the opposite side edge there is formed a corresponding or complementary recess 13 to receive the tongue of an adjacent side section. A pair of apertures 14 are preferably formed in the end walls 10 and 11, which apertures extend partially through the walls and are normally or originally closed by small webs or partitions 15. The sections of the improved meter box are preferably formed of concrete or equivalent material and if it is desired to have an aperture or apertures formed in the end walls, the webs or partitions 15 can be readily broken through to form such apertures. If such apertures are not required, however, the webs or partitions are left intact, thus leaving the end walls imperforate. To facilitate breaking through the webs or partitions 15, suitable marks 15a are preferably formed on the interior faces of the end walls opposite the centers of the webs. The top edge of each end wall is cut away or recessed directly above the recess 13, as indicated at 16, for a purpose hereinafter to be described. Likewise the top edge is preferably beveled as indicated at 17, for a purpose hereinafter to be made apparent.

Each side of the meter box is made up of one or more sections, depending upon the desired length of the completed box. In Fig. 1 the box is illustrated as having each side made up of two sections, one section being indicated at 18 and the other section being indicated at 19. These sections are very similar in construction to the constructions of the end sections 10 and 11. They are preferably somewhat longer than the end section and in the preferred form of construction the section 18 is somewhat longer than the section 19. Because of the similarity in sections and because of the different lengths, we prefer to have the sections separately identified by having molded on them respectively the legends "End", "Side A", and "Side B". Each side section has on one end a tongue 20 and on the opposite end a complementary recess 21. It likewise has apertures 22 formed therein extending partially therethrough providing the breakable webs or partitions. Each side section directly above the recess 21 has its top edge recessed as indicated at 23 and the remainder of the top edge is preferably beveled as indicated at 24. Each of the end and side sections has a vertically extending aperture 25 formed therein adjacent the edge having the recess so that the aperture is in vertical alignment with the longitudinal center of the recess. Likewise each of the tongues 12 and 20 has a corresponding aperture formed vertically therethrough which may be caused to register with the aperture 25. Fastening elements 26 are provided which may be sections of stiff wire having their upper ends bent laterally as at 27. When two or more sections are assembled together with the tongues fitting in their corresponding recesses, the fastening elements 26 may be dropped down through aperture 25 and through the tongue, the downward movement being limited by the laterally bent upper end 27 engaging the bottom of the recess on the top edge of the section. In this manner the sections may be detachably connected together to form a meter box presenting a flush or smooth top edge by virtue of the fact that the head 27 of the fastening element is recessed below the top edge of each section.

The sections 18, identified by the legend "Side A", are preferably the longest as these sections are designed, when used alone with two end sections, to provide a meter box capable of receiving a gas meter M and a regulator R. Where only one gas meter and regulator are to be contained in the meter box two sections 18 with two ends 10 and 11 are assembled together to form a small box receiving these mechanisms. If a regulator is not required but a single meter is to be contained in the meter box, two sections 19, which are somewhat shorter than the sections 18, may be used with two end sections, thus making a smaller meter box which will receive the meter M.

Where two gas meters are to be contained in the meter box, the sections 18 and 19 are assembled together and cooperate to form the sides of the box, the longer sections 18 providing the additional space required for the regulator. As only one regulator is required for several meters, only one pair of sections 18 are employed in the sides, the remaining sections being of the length of the sections 19. If it is desired to extend the length of the box, additional sections 19 are added so that by properly assembling the sections the length of the box may be varied to accommodate all of the required meters. Where the sides of the box are made up of two or more sections, we prefer to employ suitable spreaders indicated at 28. These spreaders may be formed of metal and are T-shaped in cross section, having a top flange 29, a vertical central web 30, and near the ends laterally extending flanges 31 forming abutments adapted to bear against the interior surfaces of the sides to prevent collapse. The projecting ends of the top flange 29, which project beyond the end flanges 31, rest in the recesses 23 formed in the top edges of the side sections 18 over the heads 27 of the fastening elements which connect the side sections 18 and 19 together. Suitable recesses 32 may be formed in the under sides of these projecting ends, which receive the heads 27, thus allowing the spreaders to rest flatly in the recesses 23 and thus causing the meter box to present the desired flush top edge. Covers 34 are provided which may have their under sides flanged to fit within the sections forming the walls of the box.

In installing the box the desired sections, which may be kept in stock, are selected and assembled at the location of the meters, forming the box of the required length to house all of the meters and the regulator. The necessary webs or partitions are broken through to form the apertures to receive piping P, conveying gas to and from the box. If the box is imbedded in the ground through a side walk or other concrete structure, we prefer to have the top edge of the box project above the side walk a very slight distance, such distance being apparent by the bevels 17 and 24. As these slight portions project above the surface of the side walk, they will effectively prevent rain water from flowing into the box. At the same time they will not form an elevated obstruction of such distance above the level of the side walk as to be objectionable.

From the above described construction it will be appreciated that a novel and advantageous meter box construction is provided enabling three sizes of sections to be kept in stock, these sizes being indicated by the end sections 10 and 11, the side sections 18, and the side sections 19. When it is desired to install a meter box, the required sections are selected, taken to the meter locality, and assembled, and by virtue of the improved construction the sections can be so assembled as to provide a box of the required size. The improved meter box, while it has been primarily designed to house gas meters, may be equally employed to house water meters and other similar constructions.

Various changes may be made in the details of construction without departing from the spirit or scope of the invention as defined by the appended claims.

We claim:

1. A meter box made up of sections providing end and side walls, one edge of each section having a tongue receivable in the wall of an adjacent section, fastening elements extending vertically through the sections and through the tongues connecting the sections together, said fastening elements having heads disposed in recesses in the top edges of the sections, and spreader means disposed between the side walls having portions resting in said recesses over the heads of the fastening elements disposed therein.

2. A meter box made up of sections providing end and side walls, one edge of each section having a tongue receivable in the wall of an adjacent section, detachable fastening means extending vertically through the tongues connecting said sections together, and spreader means disposed between the side walls having portions resting over the upper ends of said fastening means.

In testimony whereof we have signed our names to this specification.

LEO G. HAASE.
FRANK M. BROOKS.